(12) United States Patent
Stokes et al.

(10) Patent No.: US 8,799,190 B2
(45) Date of Patent: Aug. 5, 2014

(54) GRAPH-BASED MALWARE CLASSIFICATION BASED ON FILE RELATIONSHIPS

(75) Inventors: Jack W. Stokes, North Bend, WA (US); Nikos Karampatziakis, Ithaca, NY (US); John C. Platt, Bellevue, WA (US); Anil Francis Thomas, Redmond, WA (US); Adrian M. Marinescu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 429 days.

(21) Appl. No.: 13/163,010

(22) Filed: Jun. 17, 2011

(65) Prior Publication Data

US 2012/0323829 A1   Dec. 20, 2012

(51) Int. Cl.
*G06F 21/56* (2013.01)
*G06K 9/62* (2006.01)

(52) U.S. Cl.
CPC ............... *G06K 9/62* (2013.01); *G06K 9/6224* (2013.01); *G06F 21/56* (2013.01); *Y10S 707/952* (2013.01)
USPC .................. 706/12; 706/18; 706/20; 707/952

(58) Field of Classification Search
CPC ........ G06K 9/62; G06K 9/6224; G06F 21/00; G06F 21/56; G06F 21/564; G06F 21/565; G06F 21/566
USPC .......................................................... 706/12
See application file for complete search history.

(56) References Cited

U.S. PATENT DOCUMENTS

| 7,487,544 | B2 | 2/2009 | Schultz et al. |
| 2004/0181677 | A1 | 9/2004 | Hong et al. |
| 2007/0016953 | A1 | 1/2007 | Morris et al. |
| 2008/0127336 | A1 | 5/2008 | Sun et al. |
| 2010/0180344 | A1 | 7/2010 | Malyshev et al. |
| 2010/0192222 | A1 | 7/2010 | Stokes et al. |

OTHER PUBLICATIONS

Briones et al., Graphs, Entropy and Grid Computing: Automatic Comparison of Malware. [online], 2008 [retrieved on Jun. 29, 2013]. Retrieved from the Internet<URL:http://pandalabs.pandasecurity.com/blogs/images/PandaLabs/2008/10/07/IsmaelBriones-VB2008.pdf>.*

(Continued)

*Primary Examiner* — Jeffrey A Gaffin
*Assistant Examiner* — Nathan Brown, Jr.
(74) *Attorney, Agent, or Firm* — Steve Wight; Carole Boelitz; Micky Minhas

(57) ABSTRACT

A reliable automated malware classification approach with substantially low false positive rates is provided. Graph-based local and/or global file relationships are used to improve malware classification along with a feature selection algorithm. File relationships such as containing, creating, copying, downloading, modifying, etc. are used to assign malware probabilities and simultaneously reduce the false positive and false negative rates on executable files.

18 Claims, 11 Drawing Sheets

(56) References Cited

OTHER PUBLICATIONS

Cesare et al, Classification of Malware Using Structured Control Flow. Proc. 8th Australasian Symposium on Parallel and Distributed Computing [online], 2010 [retrieved on Jun. 29, 2013]. Retrieved from the Internet<URL:http://crpit.com/confpapers/CRPITV107Cesare.pdf>.*

Cesare, et al., "Classification of Malware Using Structured Control Flow" Retrieved at <<http://crpit.com/confpapers/CRPITV107Cesare.pdf>>, Proceedings of the Eighth Australasian Symposium on Parallel and Distributed Computing, vol. 107, Jan. 18-22, 2010, pp. 1-10.

Kinable, Joris, "Malware Detection Through Call Graphs" Retrieved at <<http://nordsecmob.tkk.fi/Thesisworks/Joris%20Kinable.pdf>>, Jun. 30, 2010, pp. 62.

* cited by examiner

GRAPH-BASED MALWARE CLASSIFICATION BASED ON FILE RELATIONSHIPS

BACKGROUND

Malware is a significant problem with effort being devoted towards automatic detection. Single instance files associated with malware have typically two sources: polymorphic and metamorphic malware which installs a unique instance of the attack on each new computer, and legitimate software which creates a unique file for each installation. It is impractical for human analysts to investigate each new file detected in the wild. Since malware authors rely on automation to avoid detection, commercial anti-malware companies need to rely on automation to detect new malware.

Machine learning and data mining technologies provide tools to improve automated malware detection. Typical approaches focus on classifying individual files in isolation and can be categorized as static analysis of binaries and dynamic analysis of program execution. Conventional algorithms range from computationally efficient methods to more complex static analysis algorithms that can be expensive in terms of processing time and processor power consumption. Further methods include using a file's reputation in relationship to the machines which report the file to improve classification. Attackers typically use automation to create new variants of malware which can by-pass anti-virus products. To combat this threat, some automated systems classify unknown files as malware. Some automated malware classification systems attempt to assign a probability that a file belongs to a specific family of malware. However, false positive rates may be unacceptably high for completely automated classification systems.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a reliable automated malware classification approach with substantially low false positive rates. According to some embodiments, graph-based local and/or global file relationships may be used to improve malware classification along with a feature selection algorithm. File relationships such as containing, creating, copying, downloading, modifying, etc. may be used to assign malware probabilities and simultaneously reduce the false positive and false negative rates on executable files.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
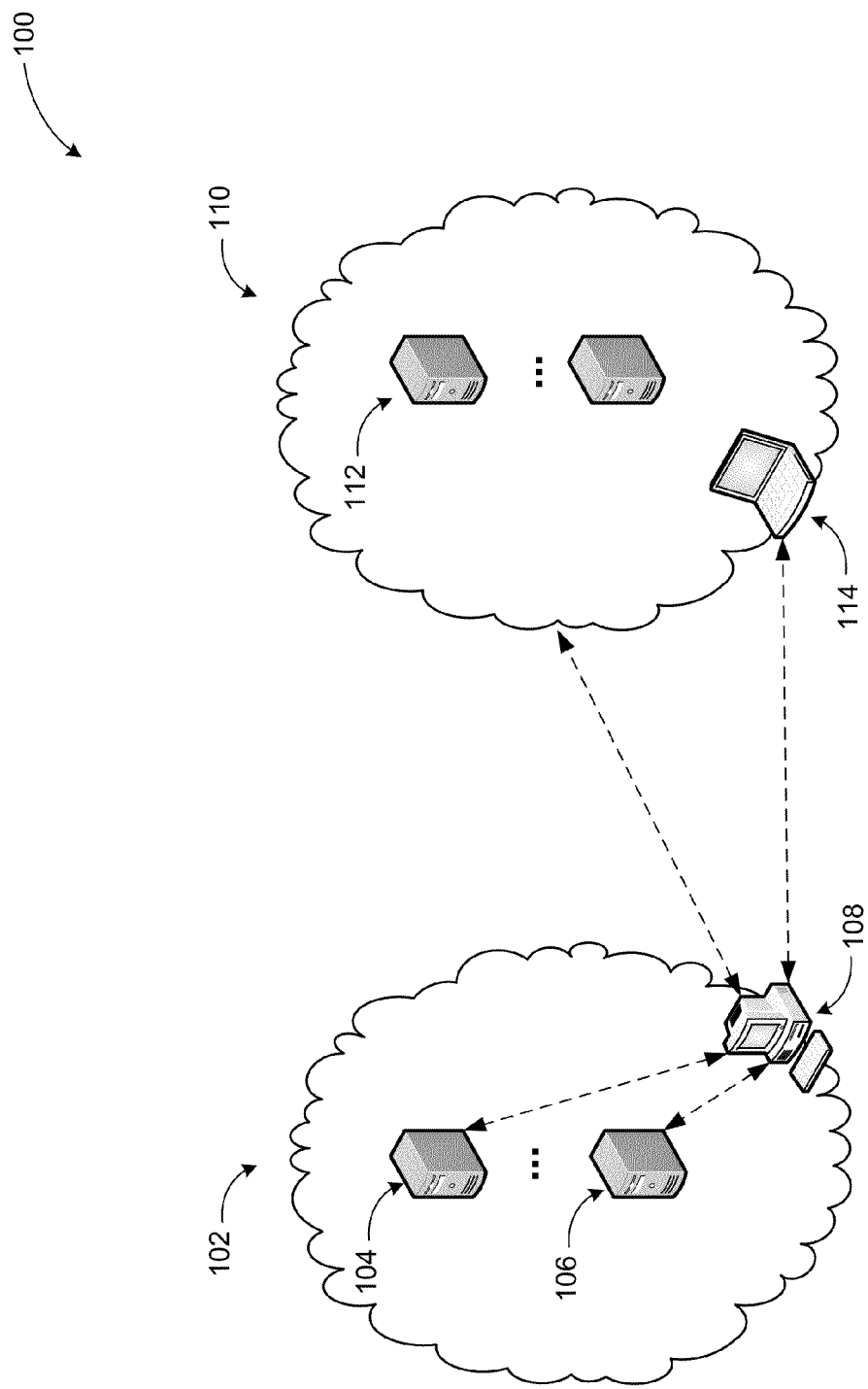
FIG. 1 illustrates an example networked environment, where file relationships may be used to improve malware classification.

As briefly described above, automated malware classification may be enhanced with substantially low false positive rates using graph-based local and/or global file relationships and a feature selection algorithm. File relationships such as containing, creating, copying, downloading, modifying, etc. may be used to assign malware probabilities and simultaneously reduce the false positive and false negative rates on executable files. While embodiments are discussed herein focusing on malware classification, the described principles may also be applied to any hierarchical representation of information that has dependency relations between entities. For example, a web page containing scripts and/or i-frames, or an application (an executable) having (or depending on) multiple components may present suitable environments for the described algorithms. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing malware classification services. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example networked environment, where file relationships may be used to improve malware classification. The example environment shown in diagram 100 includes a computing device 108 within a network 102 that communicates with servers 104 and 106 within the same network and server(s) 112 and computing device 114 in another network 110. The communications may be facilitated via a variety of protocols, security mechanisms, and physical media such as wired or wireless communications. As part of its operations, computing device 108 may receive files from other computing devices, which may be locally installed. The received files may contain other files, create new files at the computing device 108, copy files onto computing device 108, download new files, or modify existing files on computing device 108.

Some of the received files may be associated with malware such as spyware, adware, ransomware, and similar ones that perform actions without the knowledge of a user and generally against the wishes of the user. Embodiments are directed to improving automated malware classification employing local graph of file relationships and/or global graph of file relationships. The approaches simultaneously reduce false positive and false negative rates on executable files. File relationships such as containing, creating, dropping (copying), downloading, modifying, etc. or other files are propagated along a graph structure representing the files and their connections.

Prior to analyzing and updating graph-based malware classifications, a baseline malware classification probability may be assigned to one or more files in a system according to embodiments. The baseline malware classification may first compute a probability that a file belongs to one or more malware families. Because the number of malware changes constantly, new malware families are added to malware databases all the time. To address this constant change, a predefined number of malware families may be identified. If any of the files are determined to belong to malware families not contained in the list of predefined malware families, those files may be assigned to a generic malware family. Similarly, benign files may be assigned to a single class representing all benign files or to other classes representing individual benign programs (e.g. word processing programs, viewing programs, etc.).

For the baseline family-based malware classification system, system state variables, unpacked strings, Application Programming Interface (API) system call trigrams, and API system call plus an individual parameter value may be used as potential features to be ranked. A feature selection algorithm may attempt to choose a predefined number of best features per malware family benign program class and another number of best features for the generic malware and benign families. A ranked list of potential features for each family may be computed and the top K (a predefined threshold) best features selected for the family. These top K features are a mixture of different types of features depending on how well they discriminate the one family from all other malware and benign file classes (other malware families, generic malware family, benign program class and generic benign family).

To create the dataset to train the classifier, raw data may be converted from log files produced by an instrumented version of an anti-malware engine which runs an unknown file sample in a virtual machine into a feature vector, for example. Constructing a dataset from all of the raw data can result in millions of potential features and using all of the potential features may cause overfitting due to training a complex machine learning algorithm with an insufficient number of training examples. If the model is overly complex, the results when the system is deployed to production may differ significantly from those observed, when the system is trained and tested on a small labeled dataset. Thus, the number of features for the system may be selected to be the total number of samples divided by a sufficiently large number (e.g. 8-10).

For an example scenario considering the unpacked string feature, the training set may include a single example (e.g. file) containing the unpacked string "XYZ", and the file may be associated with a malware family Rbot. A classification algorithm may then learn to predict that all files containing string "XYZ" are likely to be belong to the Rbot family. To choose the best subset of features from the large number of potential features, a feature selection algorithm based on 2×2 contingency tables may be employed. A 2×2 contingency table may be constructed for each potential feature for each class under consideration. The contingency table for the potential string feature "XYZ" has four elements: A, B, C, and D. A is the number of files which are not determined to be Rbot and do not include the string "XYZ", while D is the number of files of type Rbot which do include the string "XYZ". B and C are the number of files determined (not determined) to be of type Rbot which do not (do) include string "XYZ", respectively. It should be noted that only two of the counts, C and D, need to be computed. Typically, a very small number of reports are likely to have a specific string. Thus, to estimate D and C, the number of files containing the string "XYZ" corresponding to Rbot and non-Rbot files, respectively, may be counted. A and B may be determined noting the A=NNR−C and B=NR−D, where NR and NNR are the numbers of Rbot and non-Rbot files, respectively. After the contingency table has been computed for each potential feature f, a score R(f) can be evaluated according to:

$$R(f) = \log \Gamma(A+1) + \log \Gamma(B+1) + \log \Gamma(C+1) + \log \Gamma(D+1) + \log \Gamma(A+B+C+D+4) - (\log \Gamma(A+B+2) + \log \Gamma(C+D+2) + \log \Gamma(A+C+2) + \log \Gamma(B+D+2) + \log \Gamma(4)), \quad [1]$$

where $\log \Gamma(x)$ is the log of the Gamma function ($\Gamma$) of quantity x.

The set of potential features can be ranked according to the scores for each class, and the top features selected, which best discriminate between each class (malware family, generic malware, benign program family, and generic benign). Alternative feature selection algorithms based on other metrics such as mutual information may also be employed.

Once the features for the baseline malware classification system are determined, one or more labeled datasets may be constructed based on logs extracted from an instrumented virtual machine. The logs for each individual file may be processed and any features corresponding to those selected by the feature selection system may be used to construct a training vector whose label is determined to be one of the predefined number of classes, the generic malware class, a specific benign program or the generic benign class. Then, the system may be trained using the labeled dataset employing multi-class logistic regression. Multi-class logistic regression computes N linear binary classifiers, where N is the total number of classes and a binary classifier is a simple linear hyperplane, which divides the high dimensional feature space into two sections. Other classifiers may also be used such as naïve Bayes, support vector machine, neural network, boosted decision tree, other boosted algorithms, ensemble classifiers, hierarchical classifiers and/or the like.

Figure 2:
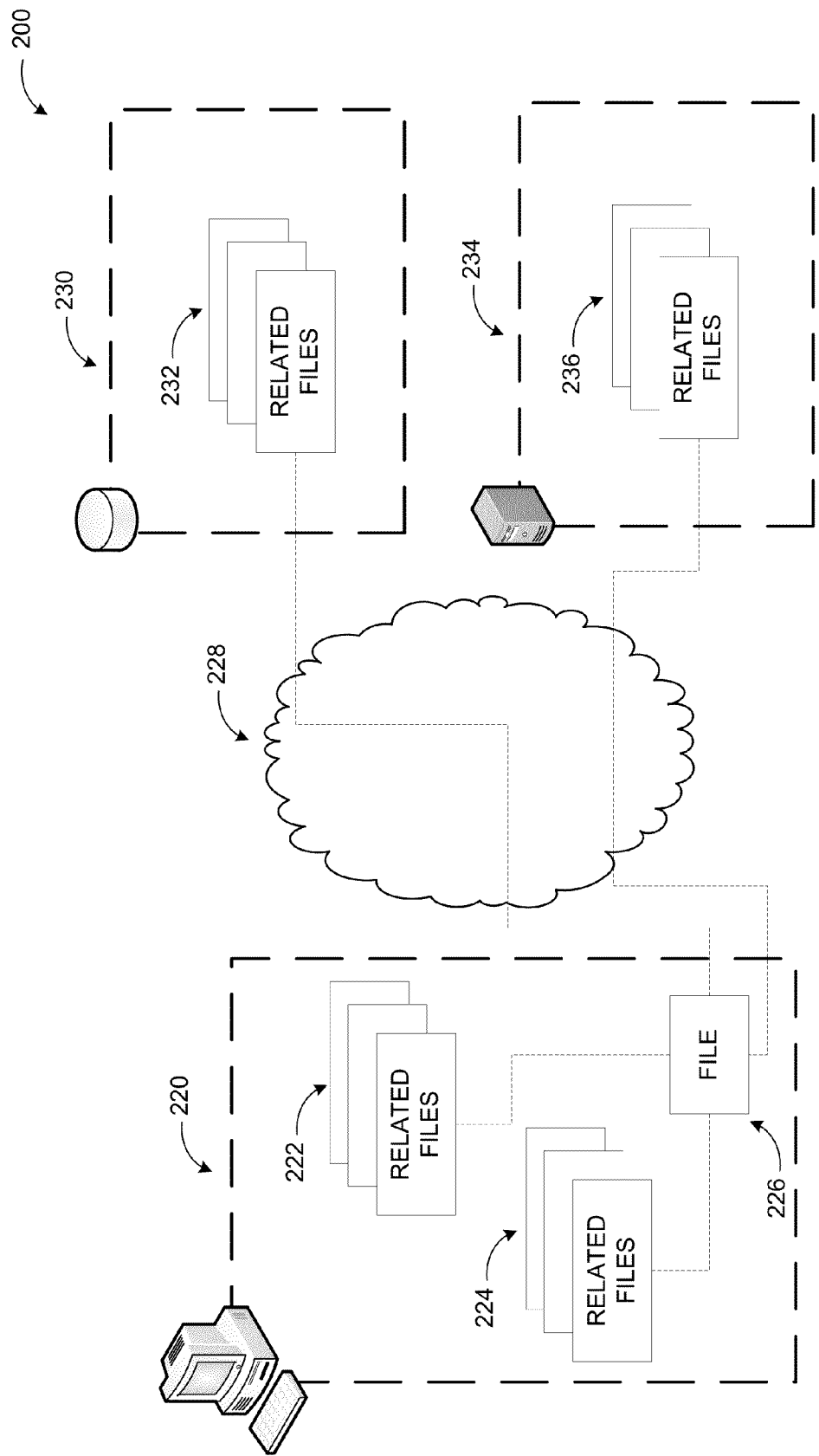
FIG. 2 illustrates another example environment, where local and global file relationships may be used to improve malware classification.

FIG. 2 illustrates another example environment, where local and global file relationships may be used to improve malware classification. Diagram 200 shows an example configuration of files and computing devices, where file relationships may be used for graph-based malware classification.

In the example configuration of diagram 200, a file 226 being assessed may be at computing device 220. File 226 may have close (e.g. one hop or a few hops) relationships based on containment, copying, downloading, creation, or modification with other files 222 and 224 residing at the same computing device. In some scenarios, computing device 220 may be connected over network 228 to a data store 230 and/or server 234, and utilize files that physically reside at data store 230 (e.g. files 232) or server 234 (e.g. files 236) such as a backend server. Thus, depending on hardware and software configurations, file relationships may be among files stored at the same computing device or on different computing devices.

Figure 3:
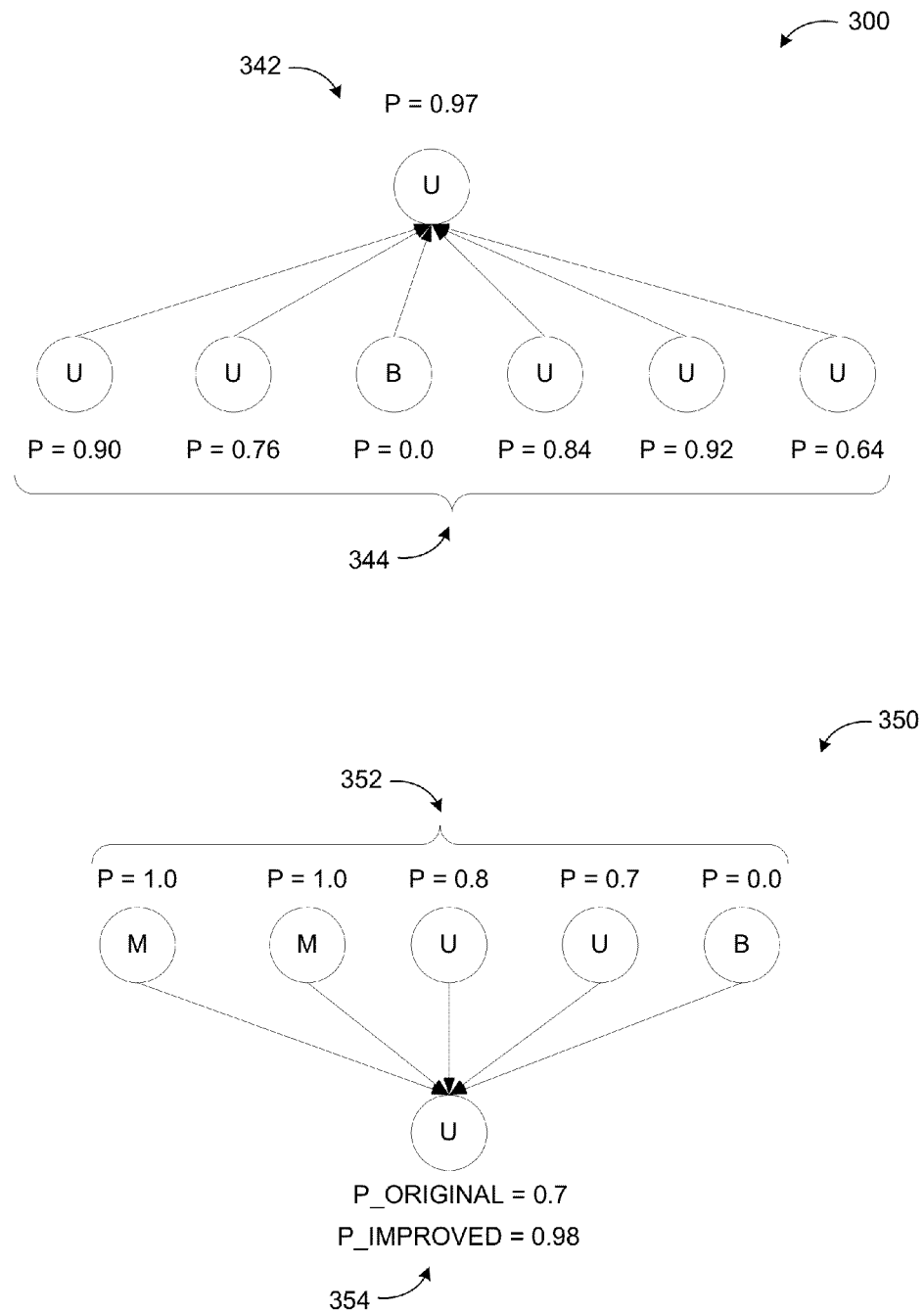
FIG. 3 illustrates an example for improved container classification using file relationships according to some embodiments.

The top portion of FIG. 3 illustrates an example for container classification using file relationships according to some embodiments. The bottom portion of FIG. 3 illustrates an example of improved file classification using file relationships. According to some example implementations, a container may be composed of three different types of files: files labeled as malware or some family of malware, files labeled as benign (or belonging to some known benign application), and unknown or unlabeled files.

Diagram 300 illustrates example files labeled as unknown ("U") and benign ("B"). In the group of files 344 belonging to the same container, a probability that one or more files is malicious is first computed. The baseline file probability is not required to be computed for each file in the container. For malware files, which are known (i.e. labeled) to be malware, the file can be assigned a probability of being malware equal to 1.0. Alternatively, the file can be evaluated using a malware classifier. If any file in the container is labeled as malware, then the entire container may be labeled as malware and given a container probability 342 of 1.0 and also labeled as malware.

A file being labeled benign (or clean) may help provide some indication that the container is benign. Such a file can either be assigned a probability of 0.0 that it is malicious or evaluated using a malware classifier in order to assign the probability. Unknown files in the container may also be evaluated and assigned a probability of maliciousness. Then, a classifier may be executed on all of the unknown and benign files to compute a probability that the container is malicious. In the example of diagram 300, the estimated container probability (0.97) is higher than the individual malicious file probabilities (e.g. 0.92, 0.90, etc.). The probabilities shown in FIG. 3 are example values for illustration purposes only.

Diagram 350 illustrates an improved file classification method according to some embodiments. According to the example scenario, an unknown file 354 may be first assigned a probability of 0.7 that it is malicious by a classifier. In addition, the same file may be contained in five other containers 352, two which are labeled as malicious, two which are unknown, and one is labeled as benign. Unlike the container classifier, being included in a container labeled as malicious does not indicate that each file is malicious in a container according to embodiments. However, being included in a malicious container increases the likelihood that the unknown file is malicious. Similarly, being included in a benign container increases the likelihood that an unknown file is benign. The improved file classification (P_IMPROVED) is achieved based on the baseline malware probability (P_ORIGINAL) combined with the probabilities of the malware of each container which includes the file.

According to some embodiments employing local file relationships approach, malware probabilities are affected by files or containers, which are located in close proximity in the graph. For example, in diagram 300 and 350, the container and file probabilities are only affected by files and containers, respectively, located one hop away. In alternate local methods, file and container probabilities may be affected by files and containers in a small neighborhood such as two or three hops away. The distance between files may be predefined or adjusted by a user in determining the "locality".

As discussed above, embodiments are directed to employing one or more local graph of file relationships and/or global graph of file relationships in classification (for malware or other purposes). The first step in the local, graph-based malware classification is to propagate information from files to containers (archives). Doing so enables assignment of a score for each archive, which can later be used to refine the probability of the file. To train the classifier, labels for each container in the training set may be obtained first. To do so, the label "Malware" may be assigned to containers, which were either previously determined as malware by an analyst, contain one or more files labeled as malware by an analyst, or at least one file in the container is determined to be malware automatically (e.g. detected by an anti-virus engine). Similarly, benign archives may be defined as those previously determined as benign by an analyst or containing no files that were labeled as malware by an analyst or other automated system.

A number of methods may be used to assign a score to a container file indicating that it is malicious such as the above discussed biased logistic regression. Other methods for assigning a malicious score to a container include the maximum probability method, union bound method, logistic regression without a bias term, and comparable ones. For the maximum probability method, the maximum malware probability of all contained files may be assigned as the container probability. By way of example in FIG. 3, the malware probability for the container 300 would be assigned a value of 0.92 since this corresponds to the maximum malware probability of the individual files. For the union bound method, probabilities of being benign may be multiplied for all contained files.

$$P_B = \pi_i P_{B,i} = \pi 9_i (1 - P_{M,i}).  \quad [2]$$

Again in FIG. 3, the probability that the container is benign is $P_B=(1-0.9)*(1-0.76)*(1-0.0)*(1-0.84)*(1-0.92)*(1-0.64)=0.000002654208$. The probability that this container is malicious using the union bound method is $P_M=1-P_B=0.999997345792$. For the logistic regression method without a bias term, how to combine the probabilities may be learned in order to optimize how well the learned combination agrees with actual labels. In some embodiments, the most prevalent relationship in the database, containment, may be used. In other words, immediate neighbors of an executable which are the archives containing it may be employed. A cascaded two-step approach may be used, first using the baseline probabilities of the files to compute the probabilities of the container and then using the probabilities of the container labels to further improve file probabilities.

In a system according to embodiments, a malware analyst does not have to look at the whole graph to get a rough idea about the suspiciousness of a file; the local neighborhood provides most of the information. Furthermore, in order for a container to be suspicious it suffices that one of its contained files is malware. Conversely, a container may be considered as having a low level of suspiciousness only when all the contained files are not suspicious. Thus, a "container classifier" for assigning a level of suspiciousness to each container may be employed. Since the determinations are binary ("malware container" or "benign container"), a logistic regression classifier may be employed with an additional offset motivated by the above observation:

$$\log \frac{p_{container}(y_i = 1 | N(i))}{p_{container}(y_i = 0 | N(i))} v^T \Psi(N(i)) + \log \frac{p_{b,max}}{1 - p_{b,max}} \quad [3]$$

where N(i) is the set of neighbors for container i, $p_{b,max}$ is the maximum of the probabilities assigned to all the files in N(i) by the baseline malware classifier, and $\Psi(N(i))$ is a vector of features calculated from the neighbors of i, and v is the vector of parameters (i.e weights) of the malware container classifier. The expression [3] provides a score. However, the probability $p_{container}(y_i=1|N(i))$ may also be used.

The above model is biasing its prediction of the suspiciousness of file i based on the most malicious file among i's neighbors, based on a container being malicious if at least one of the contained files is malicious. The assumption may be further adjusted by a linear combination of features computed from the neighborhood of i. The features may come from a simple histogram of the probabilities assigned to the container's contained files by the baseline malware classifier. More specifically, the interval [0; 1] may be split to 20 equally sized bins and create a histogram of the probabilities of the contained files. Then, the value of features $\Psi 2j$ and $\Psi 2j+1$ are the fraction of contained files that fall in the j-th bin and the logarithm of the number of contained files (plus one) that fall in the j-th bin respectively. The features may be chosen to capture both absolute and relative numbers that may affect the decision. To limit manipulation from adversaries, the absolute numbers may be transformed by a logarithm so that large manipulations of the raw numbers cause only moderate manipulations of the features (as shown in expression [3]).

It should be noted that the form of the biasing term is not chosen arbitrarily. The baseline malware classifier itself may be based on logistic regression and the form of the bias may be the inverse of the logistic link function. Hence, the biasing term may be $$w_b^T \Phi_{max}$$

where $w_b$ are the weights of the baseline classifier and $\phi_{max}$ is the feature vector of contained file with the highest probability, so may be an aggregation of all the useful features used in the baseline malware classifier. As the maximum probability in the neighborhood approaches 1, the biasing term becomes large and hence overshadows any effect from $v^T\Psi(N(i))$. When the max probability in the neighborhood approaches 0, the biasing term becomes very negative and again overshadows the effect of $v^T\Psi(N(i))$. Finally, when the max probability is 0.5, the biasing term is 0.

The vector, v, which represents the optimal way of combining the features to correct the prior assumption captured by the maximum probability of the file's neighbors, is estimated using the principle of maximum likelihood. For that, just a set of containers are needed, some determined as "malware" and some determined as "benign", together with their neighbors. The neighbors may be used to compute the features and the maximum probability for each container. Then, a search may be performed for the v that maximizes the likelihood function. This optimization can be carried out exactly and efficiently because the (negative logarithm of the) likelihood is a convex function. This approach may be computed extremely fast to make a prediction for a new container. The system only needs to look at the contained files, retrieve their probabilities from the database (if a file has not been seen before its probability may be obtained from the baseline malware classifier), compute a predefined number of (e.g., 40) features from a simple histogram (e.g., 20 bins and two features from each bin), and take a linear combination with the learned vector v. Additional features may include the log of the number of files (or the number of files) in the container and a feature which multiplies the log of the number of files (or the number of files) in the container and the $\log(p_{b,max}/(1-P_{b,max}))$. The last feature is used to learn the interaction between the number of features and the maximum file probability in the container.

An algorithm according to some embodiments does not classify the containers themselves, but improves upon a system that classifies executable files individually. In this sense, the probabilities obtained from a container classifier are just auxiliary information that summarizes the neighborhood of a file (how suspicious are the containers in which this file is found). Therefore, a second step may be introduced where information is aggregated across the containers, in which a given file participates. The final "relationship-based" classifier computes the same types of features and introduces a biasing term. The assumption reflected in the biasing term is that the baseline classifier is doing well most of the time and the neighborhood information is only used to learn a correction. The log odds of file i being malware ($y_i=1$) may be modeled as:

$$\log\frac{p_r(y_i = 1 \mid N(i))}{p_r(y_i = 0 \mid N(i))} = u^T \Psi(N(i)) + \log\frac{p_b(y_i = 1 \mid x_i)}{p_b(y_i = 0 \mid x_i)}, \quad [4]$$

where $p_r$ is the probability according to the relationship-based classifier, $p_b$ is the probability according to the baseline classifier, $\Psi$ is a vector of features computed from the neighborhood of the file and u is a vector of parameters that needs to be adjusted so that it optimally combines the features according to the maximum likelihood principle. The mapping to features vector is the same as for the container classifier: it is derived by binning the probabilities of the neighbors into a histogram and proceeding as above. At this step, the container probabilities are used, which aggregate information about files that are not directly associated with the file to be classified through the container classifier. However, this is still relevant information since these files co-occur in the same container as the file in question. As before, the neighborhood features are useful mostly when the baseline classifier's prediction is close to 0:5, and will be overshadowed by the biasing term as the baseline classifier becomes very confident.

According to some embodiments, an example algorithm for improving file probabilities for the local graph method may be as follows:

---

Let C be the set of labeled containers
Let $S_c = \{\Psi(N(i)); p_i; y_i) \mid i \in C\}$, where
    N(i) is the set of executables in a container i,
    $\Psi()$ is computed from $p_b(y_j = 1 \mid x_j)$,
    $p_i = \max_{j \in N(i)} p_b(y_j = 1 \mid x_j)$.
Find the vector v* that maximizes
    $L_c(v) = \Pi_{i \in S_c} g(t_i(v))^{y_i}(1 - g(t_i(v)))^{1-y_i}$, where
    $t_i(v) = v^T \Psi(N(i)) + \log(p_i/(1-p_i))$.
For each container i
    $p_c(y_i = 1 \mid x_i) = g(v^{*T}\Psi(N(i)) + \log(p_i/(1-p_i)))$.
Let F be the set of labeled files.
Let $S_f = \{\Psi(N(i)); p_b(y_i = 1 \mid x_i), y_i \mid i \in F\}$, where
    N(i) is the set of containers containing i and
    $\Psi()$ is computed from $p_c(y_j = 1 \mid x_j)$.
Find the vector u* that maximizes
    $L_r(v) = \Pi_{i \in S_f} g(r_i(u))^{y_i}(1 - g(r_i(u)))^{1-y_i}$, where
    $r_i(u) = u^T \Psi(N(i)) + \log(p_b(y_i=1 \mid x_i)/(1 - p_b(y_i=1 \mid x_i)))$.
For each file i
    $p_r(y_i = 1) = g(u^{*T}\Psi(N(i)) + \log(p_b(y_i=1 \mid x_i)/(1 - p_b(y_i=1 \mid x_i))))$.

---

The example algorithm summarizes the above discussed two sections related to local graph method.

In the example algorithm, $p_r$ is the probability according to the relationship based classifier, $p_b$ is the probability according to the baseline classifier, $\Psi$ is a vector of features computed from the neighborhood of the file and u is a vector of parameters for adjusting so that the features are optimally combined according to the maximum likelihood principle. The logistic link function g may be defined as $$g(t) = \frac{e^t}{1 + e^t}.$$

The mapping to features $\Psi$ is the same as for the container classifier, derived by binning the probabilities of the neighbors into a histogram and processed as above. The container probabilities aggregate information about files that are not directly associated with the file to be classified through the container classifier. This is still relevant information since these files co-occur in the same container as the file in question. The above presented algorithm is an example only. Embodiments may be implemented through other algorithms using the principles described herein.

In the local graph-based approach, only local file relationships are employed to improve a file's overall classification score. In other words, the computations are performed based on nodes, which are at one-hop (or a few hops) away from the node under consideration. In the global graph-based approach, each individual node (file) may be affected by all other nodes in the graph. An algorithm based on a conditional random field may be employed in this approach.

For the random field formulation model, all files may be modeled as vertices (potentially millions of files) with K types of edges (relationships) among files (contains, downloads, creates, modifies, etc.). Features of files, $x_i$, may be labeled by analysts with labels $y_i$. Each relationship type may have a different strength $\sigma^2_k$. Strongly related files have similar probabilities. In the random field model, the inference problem becomes: given $\theta$ and $\sigma_k$, $M_k(i)$ being the set of neighbors of i according to the relationship of type k, $\sigma_k$ being the standard deviations for relationships of type k, and $\theta$ being a vector of weights that together with the features $x_i$ can explain $z_i$ and (hence) $y_i$, and $\sigma_0$ being the standard deviations for the difference between $z_i$ and $\theta^T x_i$, find $$\hat{z} = \mathrm{argmax}\pi 9 \,p(z_i \mid x_i). \quad [5]$$

With $z_i$ defined as the latent log-odds of i-th file, the probability may be defined as:

$$p(y_i = 1 \mid z_i) = \frac{1}{1 + e^{-z_i}}. \quad [6]$$

Because taking the logarithm leaves the position of the maximum the same, [5] can be written as:

$$\hat{z} = \mathrm{argmax} \sum_{i=1}^{n} \left( -\frac{1}{2\sigma_0^2}(z_i - \theta^T x_i)^2 + \sum_{k=1}^{K} \sum_{j \in M_k} \left( -\frac{1}{2\sigma_0^2}(z_i - z_j)^2 \right) \right). \quad [7]$$

[8] may be rewritten in more compact form as:

$$\hat{z} = \mathrm{argmax} -\frac{1}{2\sigma_0^2}\|Z_i - X\theta\|^2 + \sum_{k=1}^{K} \frac{1}{2\sigma_k^2}\|A_k z\|^2, \quad [8]$$

where X is a matrix whose rows are the feature vectors of the files and $A_k$ is a $|E| \times |V|$ matrix that has one row per edge (u; v) of type k which consists of zeroes except at column u where it takes value 1 and at column v where it takes value $-1$. To maximize [8], its derivative may be set to 0, arriving at:

$$\left( I + \sum_{k=1}^{nK} a_k L_k \right) z = X\theta, \quad [9]$$

where in the last step $A^T_k A_k$ may be identified as the Laplacian matrix $L_k$ of the graph defined by the k-th relationship, and $a_k$ may be defined as $$a_k = \frac{\sigma_0^2}{\sigma_k^2}.$$

This shows that z can be obtained by the solution of a linear system with a V×V symmetric, positive definite, and sparse matrix. An obvious candidate for solving such systems is the method of conjugate gradients. To learn the parameters of the model, a gradient ascent may be performed on the likelihood. A number of penalized likelihood approaches may be employed to train the system.

For systems with files exceeding 10,000, sparse and conjugate matrices may be used for gradient. One example is symmetric positive definite (SPD), another example is diagonally dominant. In most systems, the first few iterations may contribute most to the computation. The global malware identifier may be further improved by using a preconditioner or parallelization and performing inference in groups of files (e.g. one million files).

The principles discussed above in conjunction with malware classification apply to any hierarchical representation of information that has dependency relations between entities. Thus, embodiments are not limited to malware classification. Furthermore, the methods described herein may be used to build up reputation data (or correlate/enhance reputation data).

Figure 4:
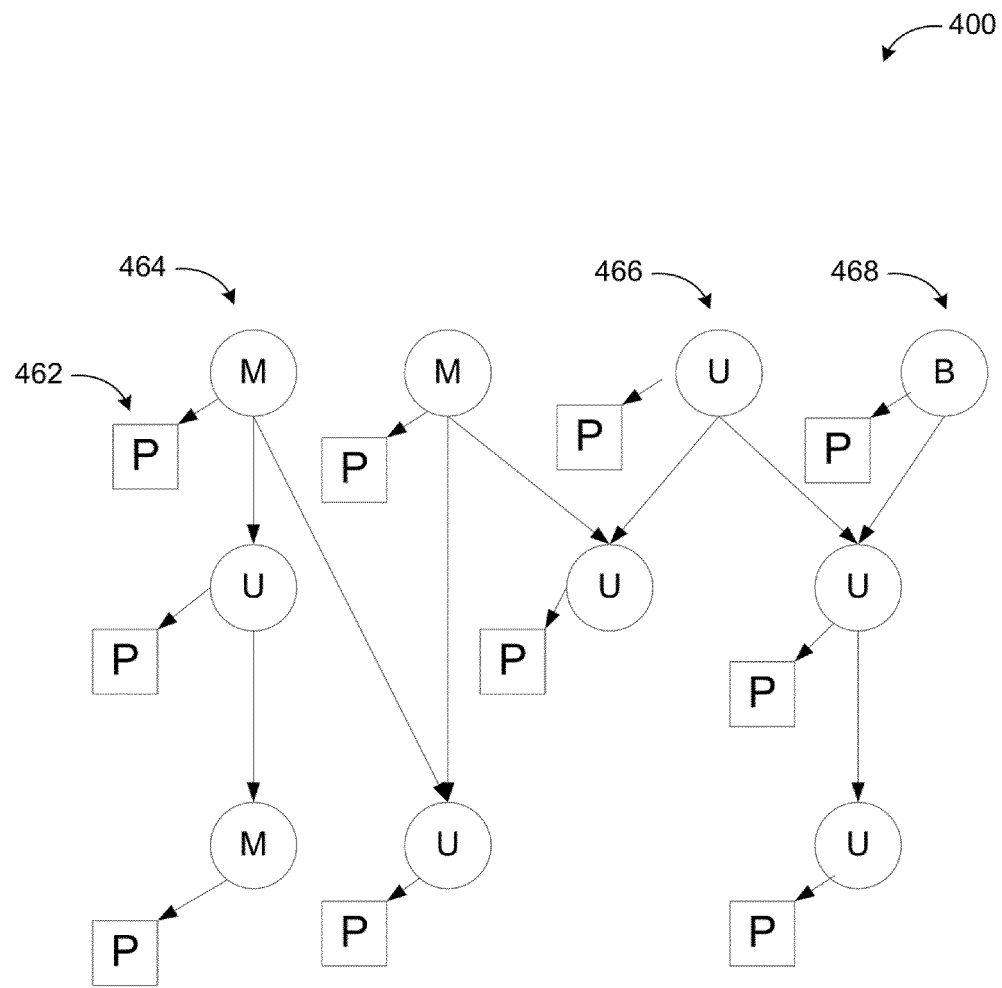
FIG. 4 illustrates an example global file relationship graph of malicious, benign, and unknown files according to some embodiments.

FIG. 4 illustrates an example global file relationship graph of malicious, benign, and unknown files according to some embodiments. Diagram 400 illustrates an example scenario, where the entire graph of malicious, benign, and unknown files is considered as opposed to local file relationships as discussed above.

Unlike the local approaches, each file or container in the graph may affect every other file or container to a degree. Each file or container is represented in the graph with a node labeled as malicious ("M") (464), benign ("B") (468), or unknown ("U") (466). Each file or container may be assigned a probability that it is malicious indicated by the square labeled P (462). The baseline file probability P (462) is not required to be computed for each file in the graph. An improved file probability can be estimated (inferred) based on the baseline probability P (462) plus the graph relationships. Alternatively, the probability that the file is malicious can be estimated based solely on the graph relationships and the malware probabilities, either baseline or improved, of other files in the global graph. As described above, malicious files or containers labeled by analysts or other automated systems such as an anti-virus product as malware can be assigned a probability of 1.0. Similarly, each file or container labeled as benign by analysts or inclusion in a whitelist of software that is known to be legitimate may be assigned a probability of 0.0. Alternatively, the files labeled as malicious and benign can be assigned a probability or score (as discussed previously) from the classifier. The unknown files and containers may each be assigned a probability that they are malicious by a baseline file classifier. In the global malware classification approach, the underlying malware probabilities may be inferred from the global model. That is, an improved estimate of the underlying probability that the file is malicious may be inferred based on the underlying probability. The global model parameters may first be learned to allow the malware probabilities to be inferred from the model. The parameters may be learned using various methods such as solving a set of linear equations, linear programming (LP) based approximation, belief propagation, message passing, graph cut algorithms, and similar approaches.

The example systems and scenarios in FIG. 1 through 4 are shown with specific components, exchanges, and configurations. Embodiments are not limited to systems according to these example configurations. Graph-based classification based on file relationships may be implemented in configurations employing fewer or additional components in applications and user interfaces.

Figure 5:
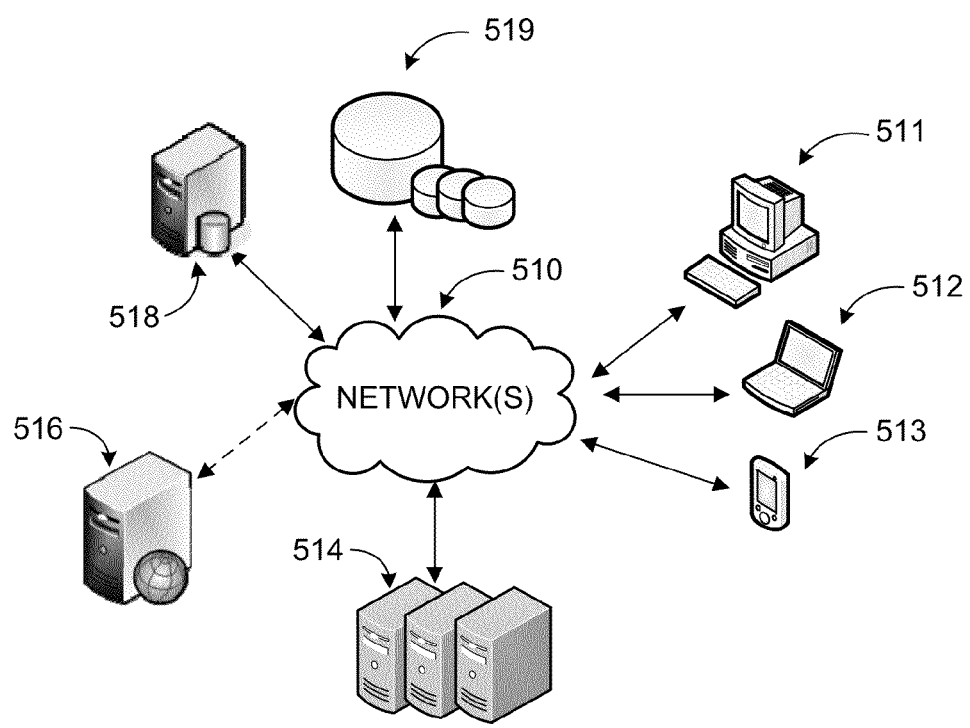
FIG. 5 is a networked environment, where a system according to embodiments may be implemented.

FIG. 5 is a networked environment, where a system according to embodiments may be implemented. A system providing malware classification may include one or more applications executed over one or more servers 514 or a single server 516 such as a hosted service. The application(s) may communicate generic or special purpose client applications (e.g., browsers or locally installed specialized clients). Client applications on individual computing devices such as a smart phone 513, a laptop computer 512, or desktop computer 511 ('client devices') may enable access to cloud based services through network(s) 510.

As discussed above, a reliable automated malware classification approach with substantially low false positive rates may utilize graph-based local and/or global file relationships to improve malware classification along with a feature selection algorithm. File relationships such as containing, creating, copying, downloading, modifying, etc. may be used to assign malware probabilities and simultaneously reduce the false positive and false negative rates on executable files. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide improved malware classification using graph-based file relationships. Furthermore, the networked environments discussed in FIG. 5 are for illustration purposes only. Embodiments are not limited to the example applications, modules, or processes.

Figure 6:
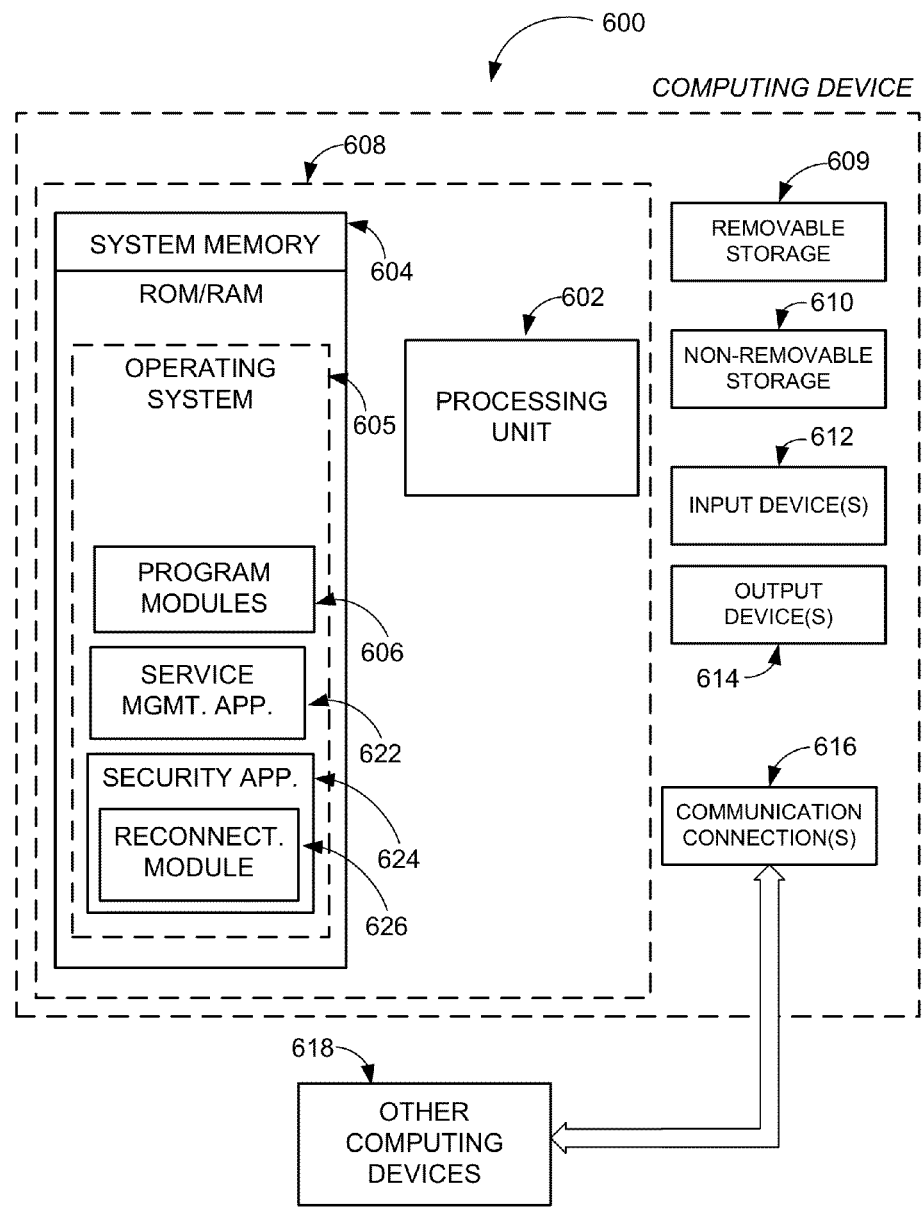
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, malware detection application 622 and classification module 624.

In addition to detecting potential malware files, malware detection application 622 may also provide other services such as file clean up, analysis, and comparable ones. Classification module 624 may be an integrated part of malware detection application 622 or a separate application and enhance categorization of files using local and/or global file relationships. As discussed earlier, embodiments are not limited to malware classification. The tasks performed by classification module 624 may also be used to perform classification in any hierarchical representation of information that has dependency relations between entities. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

The methods described in FIG. 7 through FIG. 11 discuss files and containers. However, individual files can also create or drop new files, which is analogous to the notion of file containment. It should be noted that in each example below, a containment relationship can also represent relationships where a file creates or drops additional files or containers.

Figure 7:
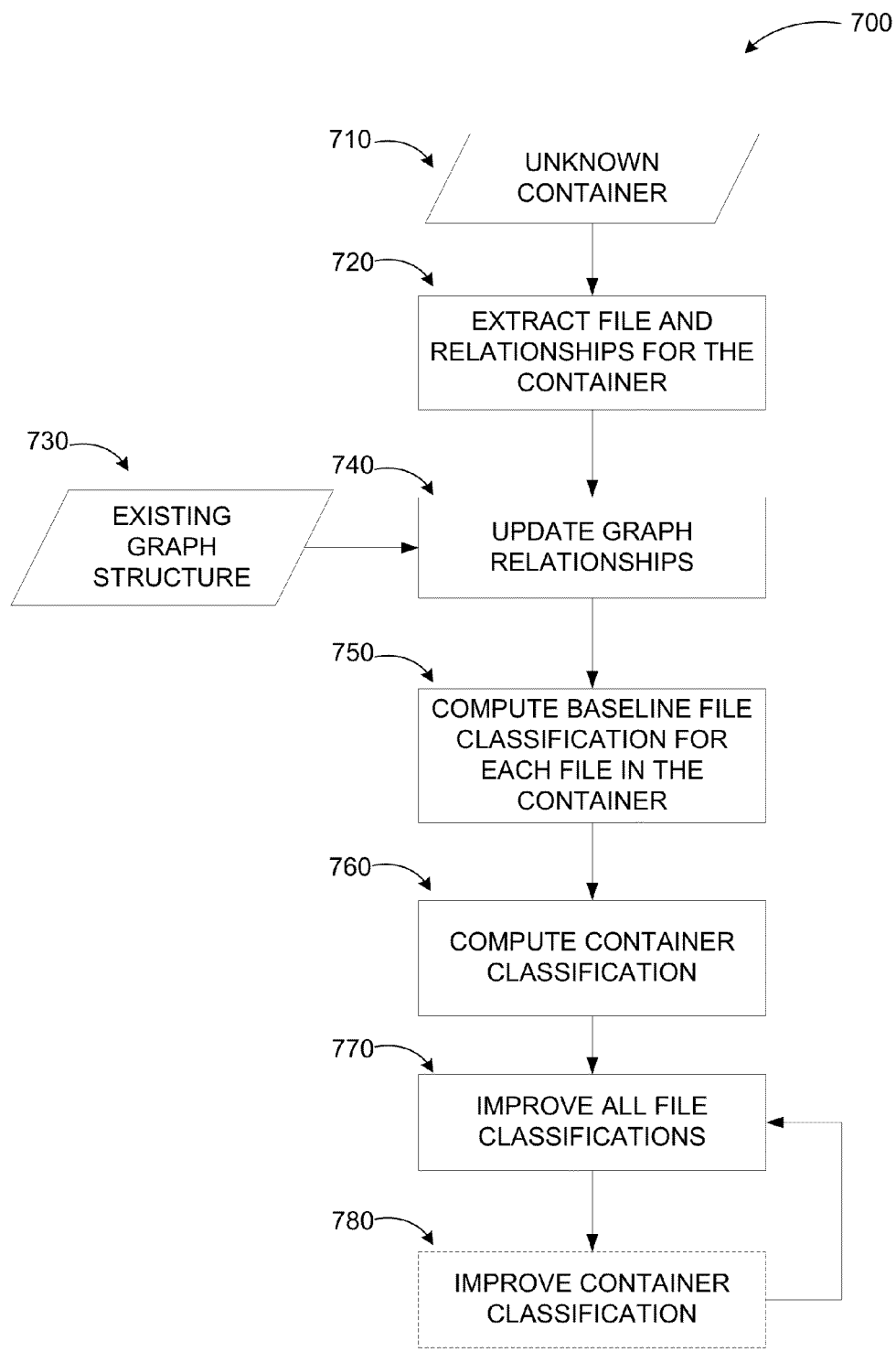
FIG. 7 illustrates a logic flow diagram of a process for improving individual file classification for a new container according to embodiments.

FIG. 7 illustrates a logic flow diagram of a process for improving individual file classification for a new container according to embodiments.

Process 700 may be employed for improving individual file probabilities when receiving an unknown container (710) based on the local approach. At operation 720, each file in the container may be extracted from the container file and the relationships determined. The relationships may be determined by analyzing whether each file is a container, creates new files, or drops (copies) new files. Assuming the container only includes files (i.e. each file in the container does not further drop or create any new files), the existing graph structure 730 may be updated based on the new container and files at operation 740. For example, if one or more files are contained in other containers, then these new file relationships may be added to the existing graph. Similarly, if the container is included in other containers, then these relationships may also be used to update the existing graph.

At operation 750, the baseline file probability of each individual file in the container may be computed for files, which have not been previously estimated. Based on these individual file probabilities, the container probability may be updated at operation 760. Next, the probabilities of all individual files in the container may be improved based on the baseline file probabilities and the probabilities of all containers which include the file at operation 770. Optionally, the container probabilities may be further improved based on the improved file probabilities and so on.

Figure 8:
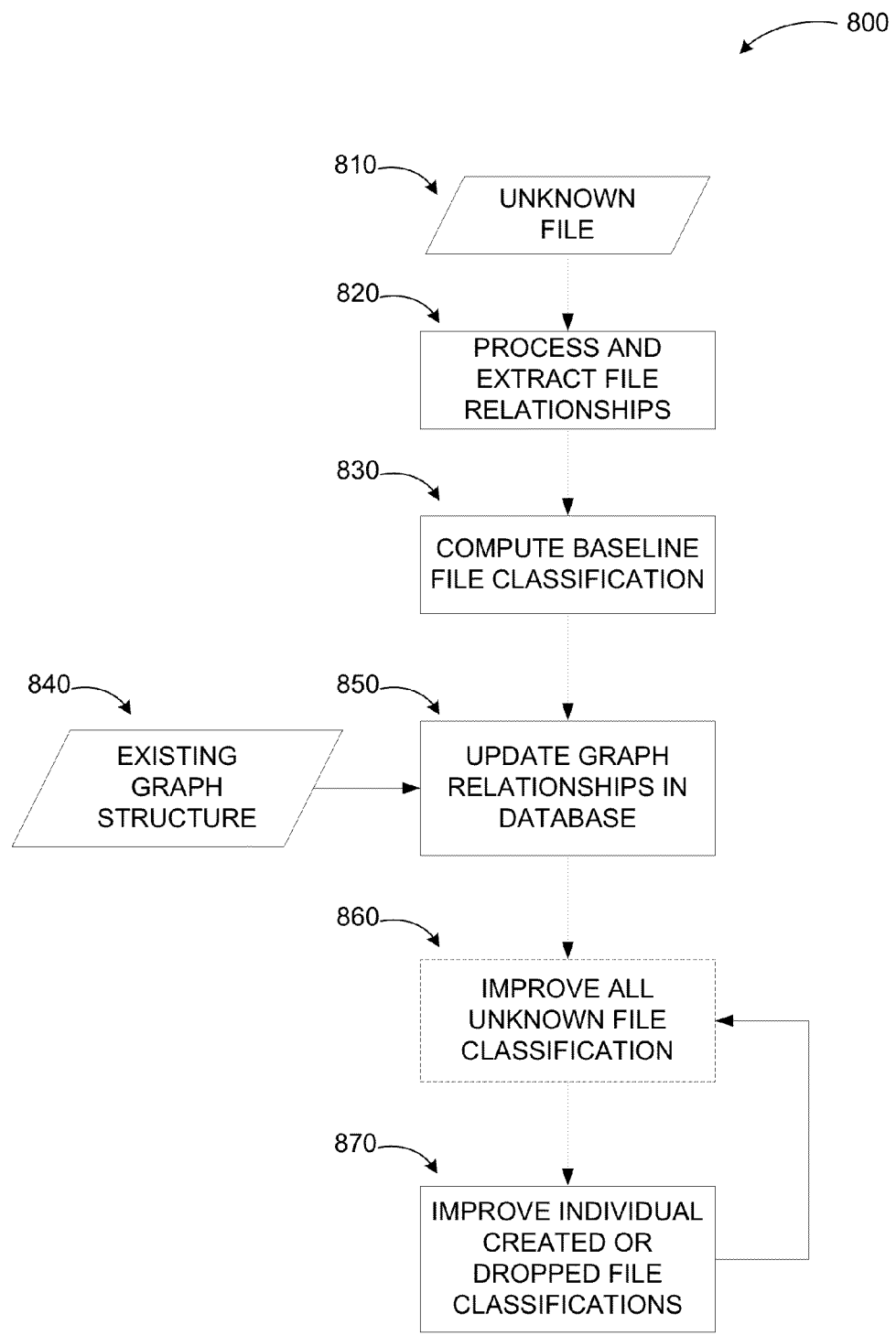
FIG. 8 illustrates a logic flow diagram of a process for improving individual file classification for a new file which creates or drops (copies) other files according to embodiments.

FIG. 8 illustrates a logic flow diagram of a process for improving individual file classification for a new file which creates or drops (copies) other files according to embodiments.

Process 800 may be employed for improving individual file probabilities when receiving an unknown file 810 based on the local approach. At operation 820, the unknown file is evaluated to determine if it creates or drops any unknown files (i.e. file relationships). This may be followed by operation 830, where the baseline file probability of each individual unknown file and the created or dropped files may be computed. The existing graph structure 840 may be updated based on the new unknown files and the created or dropped files at operation 850. For example, if one or more files are contained in other containers or are created or dropped by other files, then these new file relationships may be added to the existing graph. Similarly, if an unknown file is included in other containers, then these relationships may also be used to update the existing graph. Based on these individual, baseline file probabilities, the unknown file probability may be updated (improved) at optional operation 860. At operation 870, the probabilities of all individual files created or dropped by the unknown file may be updated based on the baseline file probabilities. Optionally, the probabilities of the unknown files 860 may be further improved based on the improved probabilities of the dropped and created files 870 and so on.

Figure 9:
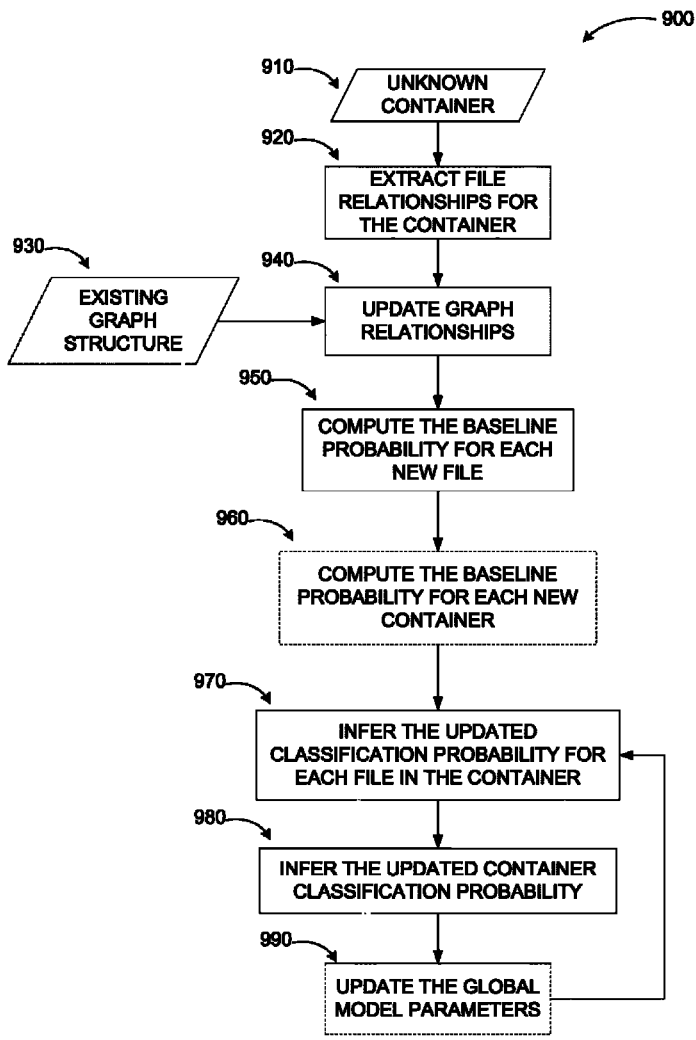
FIG. 9 illustrates a logic flow diagram of a process for improving individual file classification based on a global approach according to embodiments.

FIG. 9 illustrates a logic flow diagram of a process for improving individual file classification based on a global approach according to embodiments.

Process 900 may be employed for improving the individual file and container probabilities when receiving an unknown container 910 based on the global approach. Each file in the container may be extracted from the container file at operation 920, followed by further processing of each file in the container to determine if it is a container, creates new files, or drops new files. The existing graph structure 930 may be updated based on the new file and container relationships at operation 940. For example, if one or more files are contained in other containers, then these new file relationships may be added to the existing graph. Similarly, if the container is included in other containers, then these relationships may also be used to update the existing graph. If one of the files drops additional files, then these relationships may be added to the existing graph.

At operation 950, the baseline file probability of each individual file in the container which has not been previously estimated may be computed. Based on these individual file probabilities, the container probability may be updated at optional operation 960. Alternatively, the global model may be used to infer the container probability at operation 980. At operation 970, the improved file probability may be inferred using each file's baseline probability and the global graph model parameters (not shown). As mentioned above, the probability of the container may be inferred or the baseline probability of the container may be improved based on the baseline file probabilities and global graph model parameters (not shown) at 980. Optionally, the global model parameters may be updated based on the inferred file or container probabilities at operation 990. Updating may include learning the parameters using various methods such as solving a set of linear equations, linear programming (LP) based approximation, belief propagation, message passing, graph cut algorithms, and similar approaches. The process of inferring the probabilities and updating global model coefficients may continue in an iterative manner until the performance change from iteration to iteration is less than a predefined tolerance as indicated by the loop between operations 990 and 970.

Figure 10:
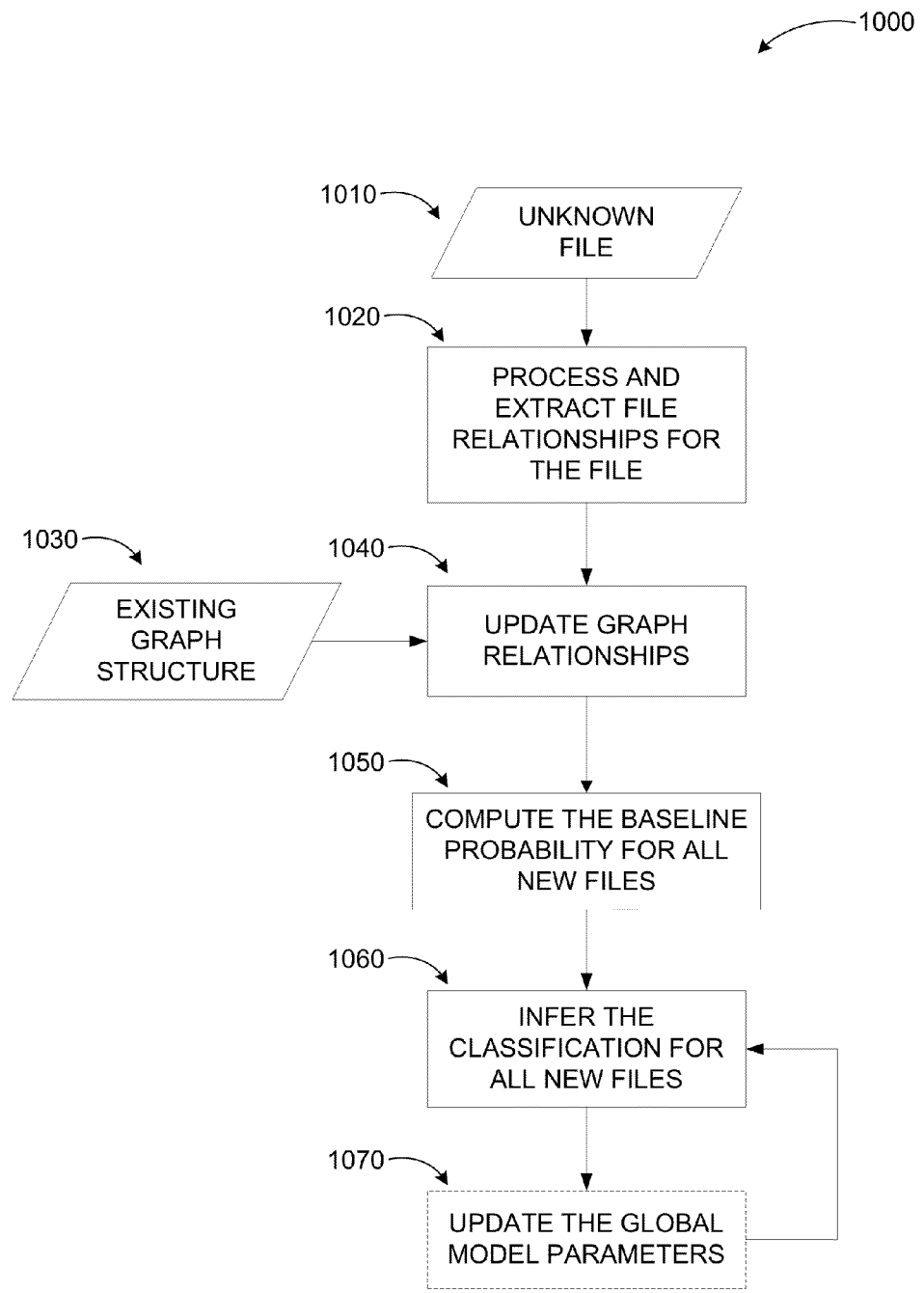
FIG. 10 illustrates a logic flow diagram of a process for improving individual file classification using a global method for a file which creates of drops other files according to embodiments.

FIG. 10 illustrates a logic flow diagram of a process for improving individual file classification using a global method for a file which creates or drops other files according to embodiments.

Process 1000 may be employed for improving the individual file and container probabilities when receiving an unknown file 1010 based on the global method similar to that described in FIG. 9. The unknown file 1010 may be processed at operation 1020. If the unknown file creates any files or drops any new files, these relationships may be noted. Each file created or dropped by the unknown file may be further processed to determine if it is a container, it creates new files, or it drops new files. The existing graph structure 1030 may be updated based on all new file relationships at operation 1040. For example, if the unknown file 1010 drops or creates additional files, these relationships are added to the existing graph. If one of the dropped or created files drops additional files, then these relationships may be added to the existing graph. In another example, if one or more dropped or created files are containers, then these new file relationships induced by the container may be added to the existing graph. Similarly, if the unknown file is included in other containers, then these relationships may also be used to update the existing graph.

At operation 1050, the baseline file probability of each individual file which has not been previously estimated may be computed. The improved file probability of all new files may be inferred at operation 1060 using each file's baseline probability and the global graph model parameters (not shown). Optionally, the global model parameters may be updated at operation 1070 based on the inferred file probabilities and the current global model parameters. Updating may include learning the parameters using various methods such as solving a set of linear equations, linear programming (LP) based approximation, belief propagation, message passing, graph cut algorithms, and similar approaches. The process of inferring the probabilities and updating global model coefficients may continue in an iterative manner until the performance change from iteration to iteration is less than a predefined tolerance as indicated by the loop between operations 1070 and 1060.

Figure 11:
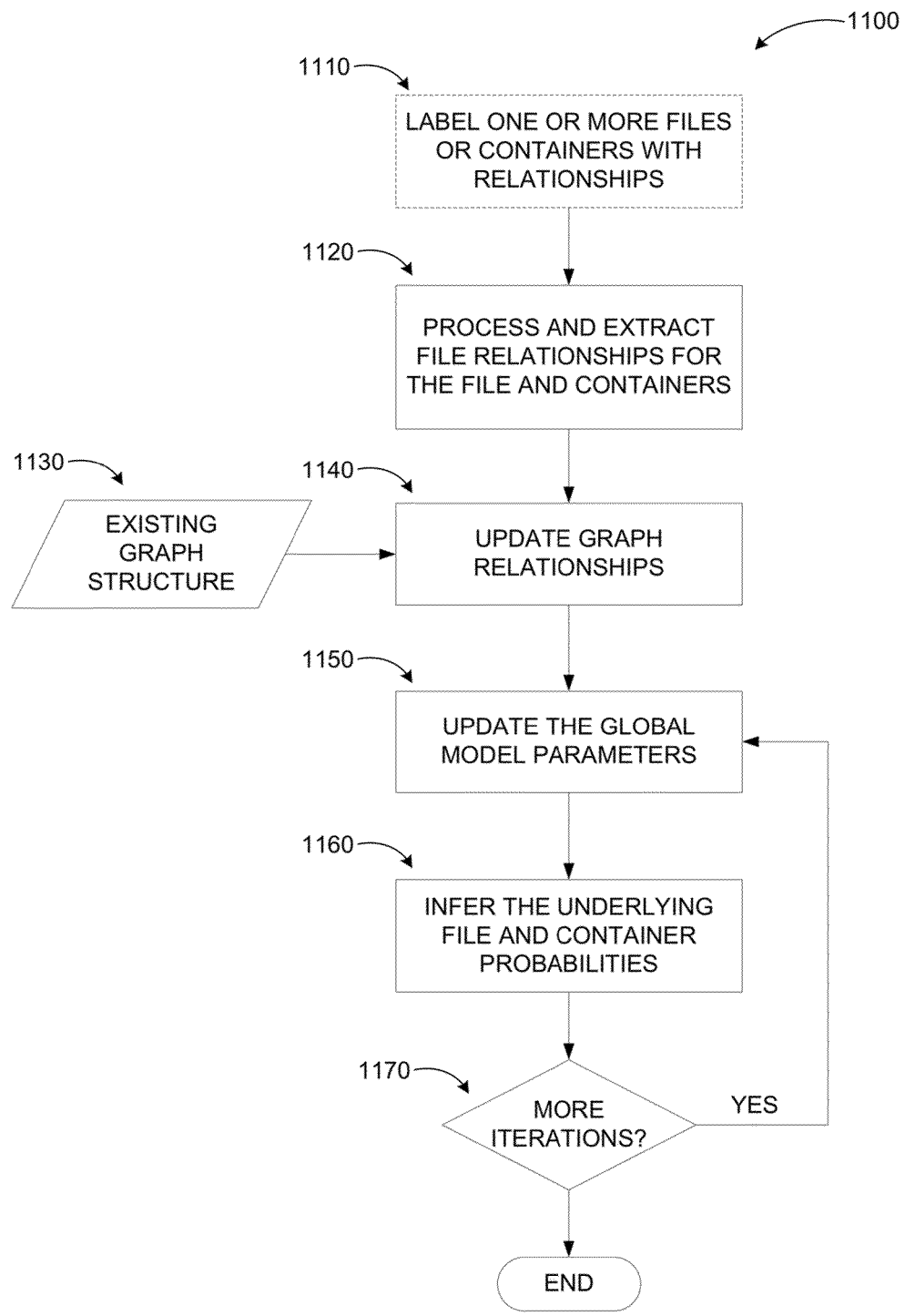
FIG. 11 illustrates a logic flow diagram of a process for updating global model parameters in improving individual file classification according to embodiments.

FIG. 11 illustrates a logic flow diagram of a process for updating global model parameters in improving individual file classification according to embodiments. Updating global model parameters can be time consuming. Instead of updating the global model parameters each time a new file or container is evaluated as shown in FIG. 9 and FIG. 10, the global model may be retrained to learn the updated global model parameters periodically.

Process 1100 describes a periodic update approach for global model parameters. One or more (i.e. a batch) newly received files and containers may be labeled by analysts or other automated methods such as being detected by an anti-malware scanner at operation 1110. Benign files and containers may be automatically labeled by trusted software developers submitting legitimate software to a backend service. The new labeled files and containers may then be processed to extract file relationships induced by these items at operation 1120.

The existing relationship graph 1130 may be updated to include these new relationships at operation 1140. The global model parameters may be retrained using the updated graph relationships at operation 1150. At this point the model learning process can halt and be applied to inference described in FIG. 9 and FIG. 10. Optionally, the model learning process may continue in an interactive process by inferring the file and container probabilities at operation 1160 followed by additional rounds of learning and inference until the training performance decreases to a predefined tolerance as indicated by the loop between operation 1160 and decision operation 1170.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in processes 700 through 1100 are for illustration purposes. Graph-based classification based on file relationships may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for graph-based classification using entity relationships, the method comprising:
   determining one or more relationships of an entity with other related entities in a hierarchical structure;
   updating a graph structure representing a group of entities including the entity and relationships between the entities;
   computing an improved classification for the entity based on the updated graph structure;
   computing an improved classification for another entity that includes the entity based on the updated graph structure and the entity's improved classification; and
   updating global model parameters based on the inferred classifications in an iterative manner until a performance change from one iteration to a next iteration is less than a predefined threshold.

2. The method of claim 1, wherein the entity is a file and the entity that includes the entity is a container.

3. The method of claim 2, wherein the one or more relationships include at least one from a set of: containing, creating, copying, downloading, and modifying.

4. The method of claim 2, wherein the classification is associated with a malware status of the entity.

5. The method of claim 2, further comprising:
   determining one or more relationships of the entity with other related entities that are one hop away from the entity.

6. The method of claim 2, further comprising:
   computing the improved classifications for the entity and for the other entity that includes the entity based on all relationships in the updated graph structure.

7. The method of claim 6, further comprising:
   employing a conditional random field algorithm.

8. The method of claim 2, further comprising:
   assigning a baseline malware classification probability using features selected by ranking potential features through a feature selection algorithm based on at least one from a set of: system state variables, unpacked strings, Application Programming Interface (API) system call trigrams, and an API system call combined with an individual parameter value.

9. The method of claim 2, further comprising:
   prior to computing the improved classifications, assigning a baseline malware classification probability to one or more files.

10. The method of claim 9, wherein the malware classification probability is based on at least one from a set of: a previous determination as malware by an analyst, one or more related files being labeled as malware by an analyst, and at least one related file being labeled as malware in the container that includes the file through automatic detection by an anti-virus engine.

11. The method of claim 9, wherein assigning the baseline malware classification probability to one or more files includes computing a score based on at least one from a set of: a maximum probability algorithm, a union bound method, a logistic regression algorithm without a bias term, and a biased logistic regression algorithm.

12. A computing device for performing graph-based malware classification using file relationships, the computing device comprising:
   a memory storing instructions; and
   a processor executing a malware detection application in conjunction with the stored instructions, the malware detection application configured to:
      assign a baseline malware classification probability to one or more files;
      determine one or more relationships of the one or more files with other related files;
      update a graph structure representing the one or more files and other related files based on their relationships;
      if the graph structure is for local file relationships:
         compute an improved classification for the one or more files based on the updated graph structure;
         compute an improved classification for a container that includes the one or more files based on the updated graph structure and the files' improved classification; and
      update global model parameters based on the inferred classifications in an iterative manner until a performance change from one iteration to a next iteration is less than a predefined threshold.

13. The computing device of claim 12, wherein the malware detection application is further configured to:
   if the graph structure is for global file relationships:
      infer an improved classification for the one or more files based on the updated graph structure; and
      infer an improved classification for the container that includes the one or more files based on the updated graph structure and the files' improved classification based on a conditional random field.

14. The computing device of claim 12, wherein the malware detection application is further configured to:
   update the graph structure by learning file relationship parameters employing at least one from a set of: solving a set of linear equations, Nelder Mead, linear programming (LP) based approximation, belief propagation, message passing, and a graph cut algorithm.

15. The computing device of claim 14, wherein the malware detection application is further configured to:
   rank the potential features according to scores for each class comprising a malware family, generic malware, a specific benign class, and a generic benign family; and
   select a predefined number of top features based on how each feature discriminates between each class.

16. The computing device of claim 15, wherein the malware detection application is further configured to:
   select the predefined number of top features by dividing a total number of samples divided by a predefined number.

17. A method for performing graph-based malware classification using file relationships, the method comprising:
   assigning a baseline malware classification probability to one or more files;
   determining one or more relationships of the one or more files with other related files, the relationships comprising at least one from a set of: containing, creating, copying, downloading, and modifying;
   constructing labeled datasets based on logs extracted from an instrumented virtual machine;
   constructing a training vector whose label is determined based on selected features for each file;
   training a classifier using the labeled datasets employing multi-class logistic regression;

updating a graph structure representing the one or more files and other related files based on their relationships;

if the graph structure is for local file relationships:
- computing an improved classification for the one or more files based on the updated graph structure; and
- computing an improved classification for a container that includes the one or more files based on the updated graph structure and the files' improved classification; and if the graph structure is for global file relationships:
- inferring an improved classification for the one or more files based on the updated graph structure; and
- inferring an improved classification for the container that includes the one or more files based on the updated graph structure and the files' improved classification based on a conditional random field.

18. The method of claim 17, wherein the multi-class logistic regression computes N linear binary classifiers, where N is a total number of classes, each class comprising a malware family, generic malware, a specific benign class, and a generic benign family, and a binary classifier is a simple linear hyperplane.

* * * * *